United States Patent
Kim et al.

(10) Patent No.: US 12,551,465 B2
(45) Date of Patent: *Feb. 17, 2026

(54) PHARMACEUTICAL COMPOSITION FOR TREATMENT OF HYPERTROPHIC CARDIOMYOPATHY AND TREATMENT METHOD USING SAME COMPOSITION

(71) Applicant: CELLTRION INC., Incheon (KR)

(72) Inventors: Bon Joong Kim, Incheon (KR); Bo Ram Lee, Incheon (KR); Hoon Namkoong, Incheon (KR); Yee Sul Cho, Incheon (KR); So Hyeon Park, Incheon (KR)

(73) Assignee: CELLTRION INC., Incheon (KR)

( * ) Notice: Subject to any disclaimer, the term of this patent is extended or adjusted under 35 U.S.C. 154(b) by 632 days.

This patent is subject to a terminal disclaimer.

(21) Appl. No.: 17/917,285

(22) PCT Filed: Apr. 22, 2021

(86) PCT No.: PCT/KR2021/005114
§ 371 (c)(1),
(2) Date: Oct. 6, 2022

(87) PCT Pub. No.: WO2021/215852
PCT Pub. Date: Oct. 28, 2021

(65) Prior Publication Data
US 2023/0190708 A1 Jun. 22, 2023

(30) Foreign Application Priority Data
Apr. 23, 2020 (KR) ........................ 10-2020-0049171

(51) Int. Cl.
*A61K 31/4164* (2006.01)
*A61K 45/06* (2006.01)
*A61P 9/00* (2006.01)

(52) U.S. Cl.
CPC .......... *A61K 31/4164* (2013.01); *A61K 45/06* (2013.01); *A61P 9/00* (2018.01)

(58) Field of Classification Search
CPC ............................ A61K 31/4164; A61K 45/06
USPC ........................................................ 514/401
See application file for complete search history.

(56) References Cited

FOREIGN PATENT DOCUMENTS

| EP | 4079297 A1 | 10/2022 |
| IN | 201841036791 | 9/2019 |
| JP | 2010-132561 A | 6/2010 |
| JP | 6522845 B1 | 5/2019 |
| JP | 2022-506440 A | 1/2022 |
| KR | 10-2020-0036755 A | 4/2020 |
| WO | WO-2020/091512 A1 | 5/2020 |
| WO | WO-2021/125824 A1 | 6/2021 |

OTHER PUBLICATIONS

Hamada et al., Journal of Cardiology, 2016, 67, 279-286 (Year: 2016).*
Takehana et al., Journal of Cardiovascular Pharmacology, 1999, 34(5) 660-665 (Year: 1999).*
International Search Report from corresponding PCT Application No. PCT/KR2021/005114, dated Aug. 5, 2021.
Written Opinion of the International Searching Authority from corresponding PCT Application No. PCT/KR2021/005114, dated Aug. 5, 2021.
Hamada, M., et al.; "Antiarrhythmic drug, cibenzoline, can directly improve the left ventricular diastolic function in patients with hypertrophic cardiomyopathy", Japanese Circulation Journal, 2001, vol. 6, 5, pp. 531-538.
Takehana, S., et al.; "Cardiovascular efforts of optical isomers of cibenzoline, assessed inthe canine isolated, blood-perfused apillary muscle and sinoatrial node preparations", Journal of Cardiovascular Pharmacology, 1999, vol. 34, No. 5, pp. 660-665.
Kajimoto, K., et al.; "Comparison of acute reduction in left ventricular outflow tract pressure gradient in obstructive hypertrophic cardiomyopathy by disopyramide versus pilsicainide versus cibenzoline", The American Journal of Cardiology, 2010, vol. 106, pp. 1307-1312.
Haruno, A., et al,; "Antiarrythmic Effects of Optical Isomers of Cibenzoline on Canine Ventricular Arrhytmias", Journal of Cariovasulcar Pharmacology, 16, 1990, pp. 376-382.
Hamada, M., et al.; "Effect of Intravenous Administration of Cibenzoline on Left Ventricular Diastolic Pressures in Patients With Hypertrophic Cardiomyopathy—Its Relationship to Transmitral Doppler Flow Profiles", Circ J 2007; 71: 1540-1544.
Office Action from corresponding Chinese Patent Application No. 202180022157.2, dated Aug. 29, 2023.
(Research progress of cibenzoline in the therapy of hypertrophic cardiomyopathy), 30, 7, 647-649, Jul. 28, 2014, Guo et al Chinese Journal of Cardiology.
Mareomi Hamada et al., Advances in medical treatment of hypertrophic cardiomyopathy, Journal of Cardiology 64 (2014)1-10.
Extended European Search Report from corresponding European Patent Application No. 21792544.5, dated Sep. 13, 2023.
Office Action from corresponding Australian Patent Application No. 2021258979, dated Sep. 20, 2023.
Office Action from corresponding Japanese Patent Application No. 2022-560992, dated Oct. 3, 2023.
Effects of antiarrhythmic drugs on obstructive hypertrophic cardiomyopathy—Mechanisms that reduce left ventricular outflow tract pressure gradient and improve left ventricular diastolic capacity, Jpn.J.Electrocardiology, 2002, vol. 22,suppl.3, pp. 57-65, Hamada et al.
Clinical effects and mechanisms of cibenzoline on hypertrophic obstructive cardiomyopathy, 2006, vol. 38, No. 4, pp. 318-323, Hamada Heart.

\* cited by examiner

*Primary Examiner* — Yevgeny Valenrod
(74) *Attorney, Agent, or Firm* — Harness, Dickey & Pierce, P.L.C.

(57) ABSTRACT

The present invention relates to a pharmaceutical composition comprising S(−)-cibenzoline or a pharmaceutically acceptable salt thereof as an active ingredient for treatment of hypertrophic cardiomyopathy, and a method for treatment of hypertrophic cardiomyopathy by using same.

14 Claims, 2 Drawing Sheets

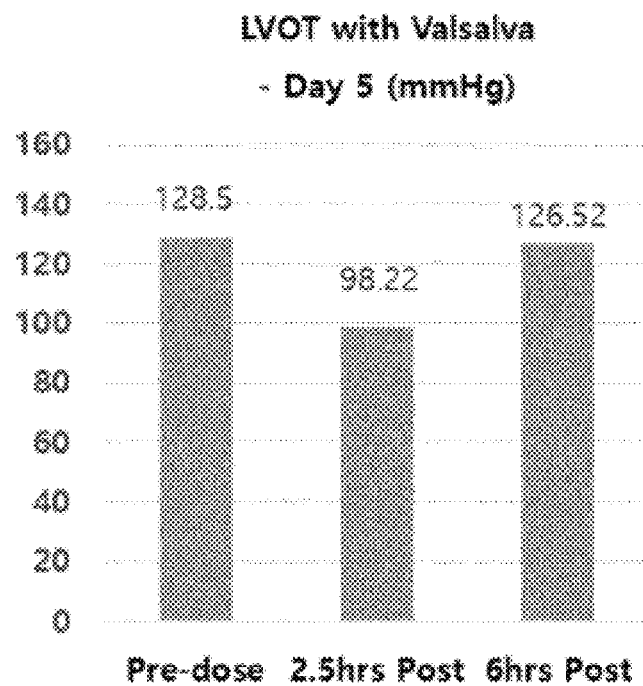

PHARMACEUTICAL COMPOSITION FOR TREATMENT OF HYPERTROPHIC CARDIOMYOPATHY AND TREATMENT METHOD USING SAME COMPOSITION

CROSS-REFERENCE TO RELATED APPLICATIONS

This application is a national phase application of PCT Application No. PCT/KR2021/005114, filed on Apr. 22, 2021, which claims benefit of Korean Patent Application No. 10-2020-0049171, filed on Apr. 23, 2020. The entire disclosure of the applications identified in this paragraph are incorporated herein by references.

TECHNICAL FIELD

The present disclosure relates to a pharmaceutical composition for treating hypertrophic cardiomyopathy containing S(−)-cibenzoline as an active ingredient, and a method for treating hypertrophic cardiomyopathy using the same.

BACKGROUND ART

Hypertrophic cardiomyopathy (HCM) is a disease known as septal hypertrophy was observed during autopsy of sudden death patients and patients who died after aortic stenosis surgery, in the middle of the 20th century. Hypertrophic cardiomyopathy (HCM) was initially thought to be a very rare disease, but recently has been found to be the most common disease which has a high prevalence of 1 in 500 births, causes sudden death especially in young individuals, and has autosomal dominant inheritance. Currently, there is no drug approved as a treatment available for hypertrophic cardiomyopathy, but the use of beta-blockers, calcium channel blockers, and diisopyramide is known in the treatment guidelines. However, it is known that the current off-label standard of care (SOC) only relieves symptoms of hypertrophic cardiomyopathy and has no effect on fundamental treatment such as suppression of disease progression.

Dr. Hamada's thesis (J Cardiol. 2016 March; 67(3): 279-86) presented clinical evidence suggesting that cibenzoline, a Class Ia antiarrhythmic drug belonging to the same class as diisopyramide, may be effective with fewer side effects than diisopyramide. However, there was no control group and there were no clinical studies related to actual treatment cases. Thus, the use and regimen of cibenzoline for hypertrophic cardiomyopathy cannot be confirmed by said study alone, and the efficacy and safety of cibenzoline must be verified through clinical trials.

Although cibenzoline is a drug that exists as two enantiomers, S(−)-cibenzoline and R(+)-cibenzoline, there has been no substantial pharmacological study on each of the enantiomers.

The present applicant has demonstrated that, when S(−)-cibenzoline is administered to patients with hypertrophic cardiomyopathy, it exhibits superior efficacy and safety compared to the current off-label standard of care.

DISCLOSURE

Technical Problem

The present invention is intended to provide a pharmaceutical composition for treating hypertrophic cardiomyopathy containing S(−)-cibenzoline or a pharmaceutically acceptable salt.

The present invention provides a method of treating hypertrophic cardiomyopathy by administering to a subject a pharmaceutical composition containing S(−)-cibenzoline or a pharmaceutically acceptable salt thereof.

Technical Solution

The present invention provides a pharmaceutical composition for treating hypertrophic cardiomyopathy containing S(−)-cibenzoline or a pharmaceutically acceptable salt thereof.

In one embodiment of the present invention, the pharmaceutically acceptable salt thereof may be selected from among salts with hydrochloric acid, hydrobromic acid, sulfuric acid, nitric acid, phosphoric acid, acetic acid, propionic acid, hexanoic acid, heptanoic acid, cyclopentanepropionic acid, glycolic acid, pyruvic acid, lactic acid, malonic acid, succinic acid, malic acid, maleic acid, fumaric acid, tartaric acid, citric acid, benzoic acid, o-(4-hydroxy-benzoyl)-benzoic acid, cinnamic acid, mandelic acid, methanesulfonic acid, ethanesulfonic acid, 1,2-ethanedisulfonic acid, 2-hydroxyethane-sulfonic acid, benzenesulfonic acid, p-chlorobenzenesulfonic acid, 2-naphthalenesulfonic acid, p-toluenesulfonic acid, camphorsulfonic acid, 4-methyl-bicyclo[2.2.2]oct-2-ene1-carboxylic acid, gluco-heptonic acid, 4,4-methylenebis(3-hydroxy-2-naphthoic) acid, 3-phenylpropionic acid, trimethyl-acetic acid, tertiary butylacetic acid, lauryl sulfuric acid, gluconic acid, glutamic acid, hydroxy-naphthoic acid, salicylic acid, stearic acid, dibenzoyl-tartaric acid, 2,3-dibenzoyl-tartaric acid, O,O-dibenzoyl-tartaric acid monohydrate, O,O-dibenzoyl-tartaric acid mono(dimethylamide), di-p-toluoyl-tartaric acid monohydrate, O,O-di-p-toluoyl-tartaric acid, menthyloxy-acetic acid, α-methoxy-α-trifluoromethylphenylacetic acid, 5-oxo-2-tetrahydrofurancarboxylic acid, N-(1-phenylethyl)phthalamic acid, 2-phenylpropionic acid, pyroglutamic acid, quinic acid, aspartic acid, 1,4-benzodioxane-2-carboxylic acid, N,N-bis[1-phenylethyl]phthalamic acid, 3-bromocamphor-10-sulfonic acid hydrate, camphanic acid, muconic acid, sodium, potassium, calcium, magnesium, aluminum, iron and zinc ions. In one embodiment of the present invention, the pharmaceutically acceptable salt is a salt with succinic acid.

In one embodiment of the present invention, the pharmaceutical composition may contain S(−)-cibenzoline or a pharmaceutically acceptable salt of S(−)-cibenzoline which is a stereochemically pure compound with a purity of 85% ee or higher. In one embodiment of the present invention, the pharmaceutical composition may contain S(−)-cibenzoline or a pharmaceutically acceptable salt of S(−)-cibenzoline with a purity of 85% ee or higher, 90% ee or higher, 98% ee or higher, or 99% ee or higher.

In one embodiment of the present invention, the pharmaceutical composition may contain S(−)-cibenzoline or a pharmaceutically acceptable salt of S(−)-cibenzoline at a total daily dose of 200 mg, 300 mg, 400 mg or 600 mg.

In one embodiment of the present invention, the pharmaceutical composition may be administered once, twice or three times a day. In one embodiment of the present invention, the pharmaceutical composition may be administered once a day or twice a day.

In one embodiment of the present invention, the pharmaceutical composition may be administered at 300 mg once a day, 200 mg once a day, 300 mg twice a day, or 200 mg twice a day.

In one embodiment of the present invention, the hypertrophic cardiomyopathy may be obstructive hypertrophic cardiomyopathy (HOCM).

In one embodiment of the present invention, the pharmaceutical composition may have one or more of the following characteristics:
  i) the Cmax of the composition is about 200 ng/mL to about 700 ng/mL;
  ii) the AUC of the composition is about 2,000 ng·hr/mL to about 15,700 ng·hr/mL; or
  iii) the minimum effective plasma concentration of S(−)-cibenzoline of the composition is 160 ng/mL or more.

In one embodiment of the present invention, the minimum effective plasma concentration of S(−)-cibenzoline of the pharmaceutical composition may be 160 ng/mL, 162 ng/mL, 170 ng/mL, 180 ng/mL, 190 ng/mL, or 200 ng/mL or more.

In one embodiment of the present invention, the hypertrophic cardiomyopathy may be obstructive hypertrophic cardiomyopathy (HOCM) having one or more of the following characteristics:
  a) a maximal left ventricular wall thickness of 15 mm or more (13 mm or more if there is a family history);
  b) a left ventricular outflow tract (LVOT) gradient of 30 mmHg or more at rest, or an LVOT gradient of 50 mmHg or more with provocation (including provocation such as Valsalva maneuver, standing, post-exercise, etc.); or
  c) a left ventricular ejection fraction (LVEF) of 55% or more.

In one embodiment of the present invention, the pharmaceutical composition may not be administered to hypertrophic cardiomyopathy patients having one or more of the following characteristics:
  1) patients with a history of heart disease, including one or more of known infiltrative, hereditary or storage disorders causing cardiac hypertrophy that mimic HCM, such as Fabry disease, amyloidosis, or Noonan syndrome with LV hypertrophy;
  2) patients with a history of persistent atrial fibrillation before screening or baseline;
  3) patients who underwent implantable cardioverter-defibrillator (ICD) implantation within 2 months before screening or who planned to undergo ICD implantation during a clinical trial period;
  4) patients with symptoms of systolic heart failure with an ejection fraction <55% or New York Heart Association (NYHA) class IV heart failure;
  5) patients with QTcF>480 msec at screening or baseline;
  6) patients with systolic BP<90 mmHg or >160 mmHg and/or diastolic BP>100 mmHg or <60 mmHg at screening or baseline;
  7) patients who received vardenafil hydrochloride, moxifloxacin hydrochloride, toremifene citrate, fingolimod hydrochloride or eliglustat tartrate, or other agents known to prolong QT/QTcF, within a period of at least 7 days or five times the half-life (whichever is longer) before screening;
  8) patients who received disopyramide or ranolazine within a period of at least 7 days or five times the half-life (whichever is longer) before screening;
  9) patients who received antiarrhythmic agents other than beta-blockers within a period of at least 7 days or five times the half-life (whichever is longer) before screening (except cases where there is no change in doses/drugs within a period of at least 7 days or times the half-life (whichever is longer) before screening for patients on beta-blockers in the opinion of a physician);
  10) patients who received inotropic agents, angiotensin converting enzyme I, angiotensin II receptor blockers (ARBs), nitrate drugs, PDE inhibitors, anticholinergics, xanthine derivatives, etc. within a period of at least 7 days or five times the half-life (whichever is longer) before screening; or
  11) patients who previously received doxorubicin as a cardiotoxic agent.

In one embodiment of the present invention, the pharmaceutical composition may improve a left ventricular outflow tract (LVOT) gradient value. In one embodiment of the present invention, the improvement may be a change (or decrease) of at least 1%, 2%, 5%, or 10% relative to an initial measured value.

In one embodiment of the present invention, the pharmaceutical composition may improve the peak volume of oxygen consumption ($PVO_2$). In one embodiment of the present invention, the improvement may be a change (or decrease) of at least 1%, 2%, 5%, or 10% relative to an initial measured value.

In one embodiment of the present invention, the pharmaceutical composition may improve symptoms classified by the New York Heart Association (NYHA) classification. In one embodiment of the present invention, the improvement may be reduction from class IV to class III, from class IV to class II, from class IV to class I, from class III to class II, class III to class I, or from class II to class I.

In one embodiment of the present invention, the pharmaceutical composition may be co-administered with other therapeutic agent for heart disease.

In one embodiment of the present invention, the other therapeutic agent for heart disease may be selected from the group consisting of beta blockers, calcium channel blockers, and antiarrhythmic drugs.

The present invention also provides a method for treating hypertrophic cardiomyopathy comprising administering to a subject a pharmaceutical composition containing S(−)-cibenzoline or a pharmaceutically acceptable salt thereof.

In one embodiment of the present invention, the subject may be a human patient.

In one embodiment of the present invention, the pharmaceutically acceptable salt in the treatment method may be selected from among salts with hydrochloric acid, hydrobromic acid, sulfuric acid, nitric acid, phosphoric acid, acetic acid, propionic acid, hexanoic acid, heptanoic acid, cyclopentanepropionic acid, glycolic acid, pyruvic acid, lactic acid, malonic acid, succinic acid, malic acid, maleic acid, fumaric acid, tartaric acid, citric acid, benzoic acid, o-(4-hydroxy-benzoyl)-benzoic acid, cinnamic acid, mandelic acid, methanesulfonic acid, ethanesulfonic acid, 1,2-ethanedisulfonic acid, 2-hydroxyethane-sulfonic acid, benzenesulfonic acid, p-chlorobenzenesulfonic acid, 2-naphthalenesulfonic acid, p-toluenesulfonic acid, camphorsulfonic acid, 4-methyl-bicyclo[2.2.2]oct-2-ene1-carboxylic acid, gluco-heptonic acid, 4,4-methylenebis(3-hydroxy-2-naphthoic) acid, 3-phenylpropionic acid, trimethylacetic acid, tertiary butylacetic acid, lauryl sulfuric acid, gluconic acid, glutamic acid, hydroxy-naphthoic acid, salicylic acid, stearic acid, dibenzoyl-tartaric acid, 2,3-dibenzoyl-tartaric acid, O,O-dibenzoyl-tartaric acid monohydrate, O,O-dibenzoyl-tartaric acid mono(dimethylamide), di-p-toluoyl-tartaric acid monohydrate, O,O-di-p-toluoyl-tartaric acid, menthyloxyacetic acid, α-methoxy-α-trifluoromethylphenylacetic acid, 5-oxo-2-tetrahydrofurancarboxylic acid, N-(1-phenylethyl)phthalamic acid, 2-phenylpropionic acid, pyroglutamic acid, quinic acid, aspartic acid, 1,4-benzodioxane-2-carboxylic acid, N,N-bis[1-phenylethyl]

phthalamic acid, 3-bromocamphor-10-sulfonic acid hydrate, camphanic acid, muconic acid, sodium, potassium, calcium, magnesium, aluminum, iron and zinc ions.

In one embodiment of the present invention, the pharmaceutically acceptable salt is a salt with succinic acid.

In one embodiment of the present invention, the S(−)-cibenzoline or the pharmaceutically acceptable salt of S(−)-cibenzoline in the treatment method may be a stereochemically pure compound with a purity of 85% ee or higher. In one embodiment of the present invention, the S(−)-cibenzoline or pharmaceutically acceptable salt of S(−)-cibenzoline may have a purity of 85% ee or higher, 90% ee or higher, 98% ee or higher, or 99% ee or higher.

In one embodiment of the present invention, the treatment method may comprise administering the pharmaceutical composition containing S(−)-cibenzoline or a pharmaceutically acceptable salt thereof at a total daily dose of 200 mg, 300 mg, 400 mg or 600 mg.

In one embodiment of the present invention, the treatment method may comprise administering the pharmaceutical composition containing S(−)-cibenzoline or a pharmaceutically acceptable salt thereof once, twice or three times a day. In one embodiment of the present invention, the treatment method may comprise administering S(−)-cibenzoline or a pharmaceutically acceptable salt of S(−)-cibenzoline once a day or twice a day.

In one embodiment of the present invention, the treatment method may comprise administering the pharmaceutical composition comprising S(−)-cibenzoline or a pharmaceutically acceptable salt thereof at 300 mg once a day, 200 mg once a day, 300 mg twice a day, or 200 mg twice a day.

In one embodiment of the present invention, the subject in the treatment method may be a patient with obstructive hypertrophic cardiomyopathy (HOCM).

In one embodiment of the present invention, the treatment method may improve a left ventricular outflow tract (LVOT) gradient value. In one embodiment of the present invention, the improvement may be a change (or decrease) of at least 1%, 2%, 5%, or 10% relative to an initial measured value.

In one embodiment of the present invention, the treatment method may improve the peak volume of oxygen consumption ($PVO_2$) at an initial stage. In one embodiment of the present invention, the improvement may be a change (or decrease) of at least 1%, 2%, 5%, or 10% relative to an initial measured value.

In one embodiment of the present invention, the treatment method may improve symptoms classified by the New York Heart Association (NYHA) classification. In one embodiment of the present invention, the improvement may be reduction from class IV to class III, from class IV to class II, from class IV to class I, from class III to class II, class III to class I, or from class II to class I.

In one embodiment of the present invention, the treatment method may comprise co-administering other therapeutic agent for heart disease to the subject.

In one embodiment of the present invention, the other therapeutic agent for heart disease in the treatment method may be selected from the group consisting of beta blockers, calcium channel blockers, and antiarrhythmic drugs.

The present invention also provides a kit comprising: a pharmaceutical composition containing cibenzoline or a pharmaceutically acceptable salt thereof; and instructions for administration to a subject.

Advantageous Effects

The composition and method for treatment according to the present invention are used to treat a hypertrophic cardiomyopathy patient. In addition, the composition and method according to the present invention have superior efficacy and safety compared to the current off-label standard of care.

BRIEF DESCRIPTION OF DRAWINGS

FIG. 3 is a chart showing the result of measuring the left ventricular outflow tract gradient with Valsalva maneuver before and after administration to Cohort 1 of Example 3.

MODE FOR INVENTION

Definitions

Figure 1:
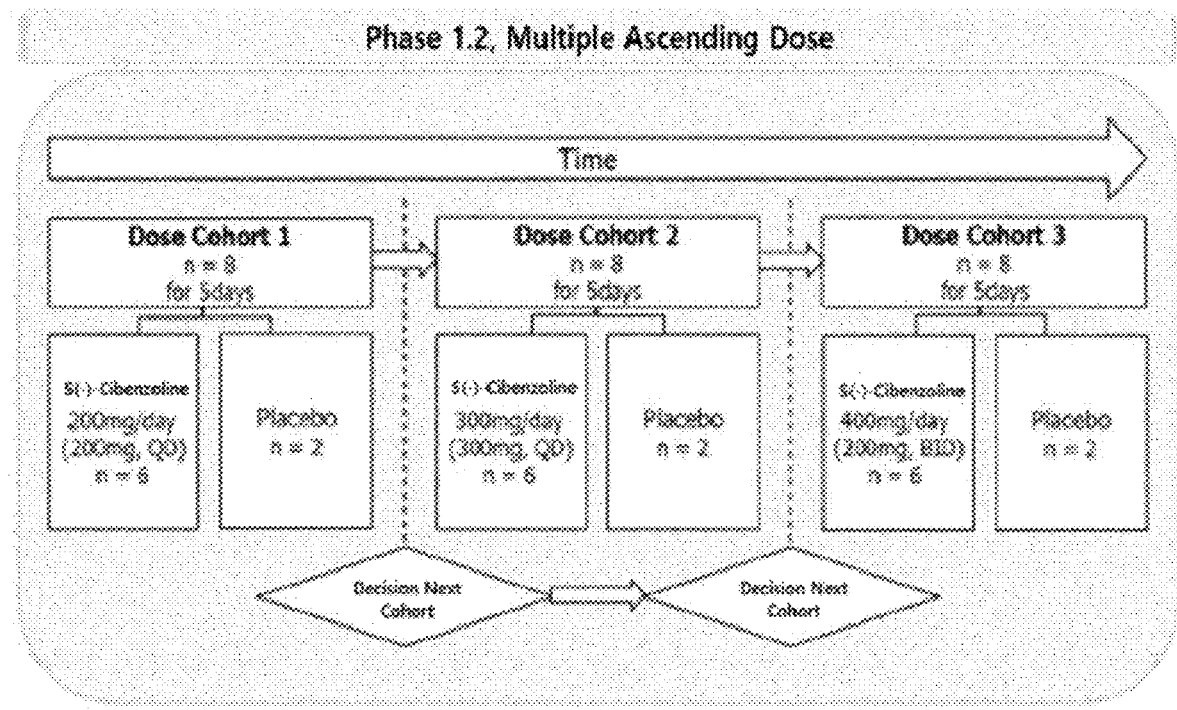
FIG. 1 is a chart showing the clinical design of Example 3.

Terms used in this specification are defined as follows.

"Pharmaceutically acceptable" means suitable for use in pharmaceutical compositions, and officially approved by a regulatory agency of a national or state government for such use, or being listed in the U.S. Pharmacopoeia or other generally recognized pharmacopoeia for use in animals (particularly in humans).

"Pharmaceutically acceptable carrier" means a diluent, adjuvant, excipient or carrier or other ingredient that is pharmaceutically acceptable and is administered together with the compound according to the present disclosure.

"Pharmaceutically acceptable salt" refers to a salt capable of enhancing pharmacological activity. Examples of pharmaceutically acceptable salts include acid addition salts formed with inorganic or organic acids, metal salts and amine salts. Examples of acid addition salts formed with inorganic acids include salts with hydrochloric acid, hydrobromic acid, sulfuric acid, nitric acid and phosphoric acid. Examples of acid addition salts formed with organic acids include salts with acetic acid, propionic acid, hexanoic acid, heptanoic acid, cyclopentanepropionic acid, glycolic acid, pyruvic acid, lactic acid, malonic acid, succinic acid, malic acid, maleic acid, fumaric acid, tartaric acid, citric acid, benzoic acid, o-(4-hydroxy-benzoyl)-benzoic acid, cinnamic acid, mandelic acid, methanesulfonic acid, ethanesulfonic acid, 1,2-ethanedisulfonic acid, 2-hydroxyethanesulfonic acid, benzenesulfonic acid, p-chlorobenzenesulfonic acid, 2-naphthalenesulfonic acid, p-toluenesulfonic acid, camphorsulfonic acid, 4-methyl-bicyclo[2.2.2]oct-2-ene1-carboxylic acid, gluco-heptonic acid, 4,4-methylenebis(3-hydroxy-2-naphthoic) acid, 3-phenylpropionic acid, trimethyl-acetic acid, tertiary butylacetic acid, lauryl sulfuric acid, gluconic acid, glutamic acid, hydroxy-naphthoic acid, salicylic acid, stearic acid, dibenzoyl-tartaric acid, 2,3-dibenzoyl-tartaric acid, O,O-dibenzoyl-tartaric acid monohydrate, O,O-dibenzoyl-tartaric acid mono(dimethylamide), di-p-toluoyl-tartaric acid monohydrate, O,O-di-p-toluoyl-tartaric acid, menthyloxyacetic acid, α-methoxy-α-trifluoromethylphenylacetic acid, 5-oxo-2-tetrahydrofurancarboxylic acid, N-(1-phenylethyl)phthalamic acid, 2-phenylpropionic acid, pyroglutamic acid, quinic acid, aspartic acid, 1,4-benzodioxane-2-carboxylic acid, N,N-bis[1-phenylethyl]phthalamic acid, 3-bromocamphor-10-sulfonic acid hydrate, camphanic acid and muconic acid. Examples of metal salts include salts with sodium, potassium, calcium, magnesium, aluminum, iron and zinc ions.

Examples of amine salts include salts with ammonia and organic nitrogenous bases strong enough to form salts with carboxylic acid.

"Solvate" means the compound or salt thereof according to the present disclosure, which further comprises a stoichiometric or non-stoichiometric amount of a solvent bound by non-covalent intermolecular forces. Preferred solvents are volatile, non-toxic, and/or acceptable for administration to humans in trace amounts.

"Hydrate" means the compound or salt thereof according to the present disclosure, which further comprises a stoichiometric or non-stoichiometric amount of water bound by non-covalent intermolecular forces.

"Therapeutically effective amount" means an amount of a compound sufficient to ameliorate, palliate, stabilize, reverse, slow or delay the progression of a disease state or a symptom of a disease when the compound is administered.

"Treatment or treating" means ameliorating or reversing the progression or severity of a disease, or ameliorating or reversing one or more symptoms or side effects of the disease. In the present specification, "treatment" further refers to an approach for obtaining beneficial or desired clinical results, where "beneficial or desired clinical results" include, without limitation, alleviation of a symptom, diminishment of the extent of a disorder or disease, stabilized disease state, delay or slowing of the progression of a disease state, amelioration or palliation of a disease state, and remission of a disease, whether partial or total.

"Subject" includes any human or non-human animal. The term "non-human animal" includes, but is not limited to, vertebrates such as non-human primates, sheep, dogs, cats, rabbits and ferrets, rodents, birds, amphibians, and reptiles. In one embodiment, the subject is a mammal, a human, a non-human primate, sheep, a dog, a cat, a rabbit, a ferret or a rodent. In the present specification, the terms "subject", "patient" and "individual" are used interchangeably.

The term "composition" refers to a product comprising a specified amount of a compound or pharmaceutically acceptable salt described herein, excipients as defined herein and other optional ingredients, as well as any product produced directly or indirectly from a combination of specified amounts of specified ingredients.

"Excipient" refers to a substance that aids the administration of an active agent to a subject. Pharmaceutical excipients include, but are not limited to, binders, fillers, disintegrants, lubricants, coatings, sweeteners, flavors and colors.

"Kit" means a product comprising components for administering a composition for the treatment of a disease. In one embodiment, the kit comprises a box or container that holds the components of the kit. The box or container is affixed with a label or a Food and Drug Administration-approved protocol.

"Cmax", "Cmin", "Tmax", "Tmin", "T1/2" and "AUC" are terms used in pharmacokinetic analyses of the concentration of a drug against time. "Cmax" is a term that refers to the maximum (or peak) plasma concentration that a drug achieves in a specified compartment or test area of the body after the drug has been administered and prior to the administration of a second dose. Cmax is the opposite of Cmin, which is the minimum (or trough) concentration that a drug achieves after dosing. "Tmax" is the term used in pharmacokinetics to describe the time at which the Cmax is observed, and "Tmin" is the term used in pharmacokinetics to describe the time at which the Cmin is observed after the drug has been administered and prior to the administration of a second dose. "T1/2" means the time it takes for the plasma concentration of a drug in the body to reach half of its original value. "AUC" means the area under the curve (mathematically known as a definite integral) in a pharmacokinetic plot of the concentration of a drug against time.

"Minimum effective plasma concentration" means the lowest plasma concentration of a drug capable of exerting a therapeutic effect.

"a" or "an" means one or more.

The term "comprise" and its derivatives are used herein interchangeably as comprehensive, open-ended terms. For example, the use of "comprising" means that whatever element is comprised, is not the only element encompassed by the subject of the clause that contains the verb.

"About" means a range of values including the specified value, which a person of ordinary skill in the art would consider reasonably similar to the specified value. In one embodiment, the term "about" means within a standard deviation using measurements generally acceptable in the art. In one embodiment, "about" means a range extending to +/−10% of the specified value. In one embodiment, "about" means the specified value.

S(−)-Cibenzoline or Pharmaceutically Acceptable Salt Thereof

[Formula 1]

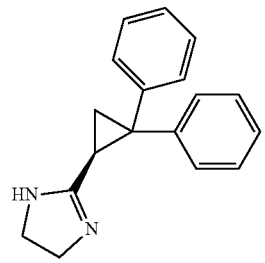

S(−)-cibenzoline (escibenzoline; S-cibenzoline; S-cifenline; (−)-cibenzoline; (−)-cifenline;S-2-(2,2-diphenylcyclopropyl)-4,5-dihydro-1H-imidazole) is a compound having the structure of Formula 1.

S(−)-cibenzoline of the present invention may include not only S(−)-cibenzoline free salt, but also a chloride thereof, and S(−)-cibenzoline may be not only a pharmaceutically acceptable salt thereof, but also any hydrate or solvate thereof. In one embodiment, the hydrate or solvate may be a solvate (especially a hydrate) prepared by dissolving S(−)-cibenzoline in a water-miscible solvent such as methanol, ethanol, acetone, or 1,4-dioxane, and then adding a free acid or a free base thereto, followed by crystallization or recrystallization. The present disclosure may include within its scope stoichiometric solvates including hydrates as well as compounds containing variable amounts of water that may be produced by processes such as lyophilization. In one embodiment of the present invention, the pharmaceutically acceptable salt is a salt with succinic acid.

In one embodiment, the compound is a stereochemically pure compound, e.g., a compound substantially free from other stereoisomers (e.g., 85% ee or more, 90% ee or more, 95% ee or more, 97% ee or more, or 99% ee or more).

The S(−)-cibenzoline may be formulated for administration to a patient, and the formulation includes at least one pharmaceutically acceptable carrier or excipient. The carrier means that it is compatible with other components of the formulation and is not harmful to the recipient. The drug may be formulated for oral, intravenous or rectal administration. Examples of the formulation include conventional forms such as tablets, capsules, and syrup.

Hypertrophic CardioMyopathy (HCM)

Hypertrophic cardiomyopathy is characterized by abnormal hypertrophy of the heart muscle, and comprises a group of highly penetrant, monogenic, autosomal dominant myocardial diseases. HCM is caused by one or more of over 1,000 known point mutations in any one of the protein genes contributing to the sarcomere that is the functional unit of myocardium. HCM was initially thought to be a very rare disease, but recently has been found to be the most common disease which has a high prevalence of 1 in 500 births, causes sudden death especially in young individuals, and has autosomal dominant inheritance. HCM is often found incidentally while performing electrocardiogram and echocardiography for health check-up in young adults, followed by follow-up in many cases.

Hemodynamically or symptomatically, hypertrophic cardiomyopathy may be classified into obstructive HCM and non-obstructive HCM depending on the flow of blood from the left ventricle (one of the four chambers of the heart that pumps oxygenated blood throughout the body). In particular, the ventricular septum (the wall separating the left and right sides of the heart) becomes hypertrophied and bulges toward the left ventricle to obstruct blood flow from the left ventricle, thereby putting stress on the ventricles to pump blood. This is called hypertrophic obstructive cardiomyopathy. Occlusive HCM can be divided into subvalvular obstruction and mid-ventricular obstruction and delayed obstructive HCM refers to a case in which there is no gradient at rest but there is an LVOT gradient of 30 mmHg or more upon provocation.

Clinical symptoms for patients with hypertrophic cardiomyopathy include dyspnea on exertion, systemic arterial thromboembolic diseases including stroke, acute pulmonary edema, atrial fibrillation, intolerance of hypovolemia or hypervolemia, and syncope. Recently, sudden cardiac death (SCD) has also been identified as a major symptom of hypertrophic cardiomyopathy.

Currently, treatment for the symptoms of hypertrophic obstructive cardiomyopathy patients varies from lifestyle improvement to surgery. Current treatment regimens applicable to hypertrophic obstructive cardiomyopathy have not been optimized because they failed to adequately target the mechanisms responsible for the development of symptoms in most hypertrophic obstructive cardiomyopathy patients. Moreover, current treatment regimens cannot be used for long periods of time due to limited efficacy or side effects and do not prevent hypertrophic obstructive cardiomyopathy from progressing to heart failure.

Subject to be Treated

In one embodiment of the present invention, the subject to be treated may include one or more of the following characteristics:
  a) a maximal left ventricular wall thickness of 15 mm or more (13 mm or more if there is a family history);
  b) a left ventricular outflow tract (LVOT) gradient of 30 mmHg or more at rest, or an LVOT gradient of 50 mmHg or more with provocation (including provocation such as Valsalva maneuver, standing, post-exercise, etc.); or
  c) a left ventricular ejection fraction (LVEF) of 55% or more.

In one embodiment of the present invention, the subject to be treated may not include one or more of the following characteristics:

1) patients with a history of heart disease, including one or more of known infiltrative, hereditary or storage disorders causing cardiac hypertrophy that mimic HCM, such as Fabry disease, amyloidosis, or Noonan syndrome with LV hypertrophy;
2) patients with a history of persistent atrial fibrillation before screening or baseline;
3) patients who underwent implantable cardioverter-defibrillator (ICD) implantation within 2 months before screening or who planned to undergo ICD implantation during a clinical trial period;
4) patients with symptoms of systolic heart failure with an ejection fraction <55% or New York Heart Association (NYHA) class IV heart failure;
5) patients with QTcF>480 msec at screening or baseline;
6) patients with systolic BP<90 mmHg or >160 mmHg and/or diastolic BP>100 mmHg or <60 mmHg at screening or baseline;
7) patients who received vardenafil hydrochloride, moxifloxacin hydrochloride, toremifene citrate, fingolimod hydrochloride or eliglustat tartrate, or other agents known to prolong QT/QTcF, within a period of at least 7 days or five times the half-life (whichever is longer) before screening;
8) patients who received disopyramide or ranolazine within a period of at least 7 days or five times the half-life (whichever is longer) before screening;
9) patients who received antiarrhythmic agents other than beta-blockers within a period of at least 7 days or five times the half-life (whichever is longer) before screening (except cases where there is no change in doses/drugs within a period of at least 7 days or five times the half-life (whichever is longer) before screening for patients on beta-blockers in the opinion of a physician);
10) patients who received inotropic agents, angiotensin converting enzyme I, angiotensin II receptor blockers (ARBs), nitrate drugs, PDE inhibitors, anticholinergics, xanthine derivatives, etc. within a period of at least 7 days or five times the half-life (whichever is longer) before screening; or
11) patients who previously received doxorubicin as a cardiotoxic agent.

Administration

Administration refers to administration of a substance (e.g., cibenzoline or a pharmaceutically acceptable salt thereof) to achieve a therapeutic purpose (e.g., treatment of hypertrophic cardiomyopathy). The administration may be done orally or parenterally, and examples of parenteral administration include intravenous injection, subcutaneous injection, intramuscular injection, intraperitoneal injection, endothelial administration, topical administration, intranasal administration, intrapulmonary administration, and rectal administration. The administration includes any method of delivering a drug to a subject to achieve a therapeutic purpose.

Dosage

A suitable dosage of the pharmaceutical composition of the present invention may be selected depending on various factors such as formulation method, administration mode, patient's age, weight, sex, pathological condition, diet, administration time, administration route, excretion rate, and response sensitivity.

In one embodiment of the present invention, the once-daily dosage of the pharmaceutical composition of the present invention may be about 100 mg to about 1,000 mg, about 100 mg to 800 mg, about 100 mg to 600 mg, about 150 mg to about 1,000 mg, about 150 mg to about 800 mg, about 150 mg to about 600 mg, about 150 mg to about 400 mg, about 200 mg to about 1,000 mg, about 200 mg to about 800 mg, about 200 mg to about 600 mg, or about 200 mg to about 400 mg.

In one embodiment of the present invention, the total daily dose of the pharmaceutical composition of the present invention may be 200 mg, 300 mg, 400 mg or 600 mg. In a further embodiment, the daily dosage is administered once daily.

In one embodiment of the present invention, the total daily dosage of the pharmaceutical composition of the present invention may be 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, 350 mg, 360 mg, 370 mg, 380 mg, 390 mg, 400 mg, 410 mg, 420 mg, 430 mg, 440 mg, 450 mg, 460 mg, 470 mg, 480 mg, 490 mg 500 mg, 510 mg 520 mg, 530 mg, 540 mg, 550 mg, 560 mg, 570 mg, 580 mg 590 mg or 600 mg.

Frequency of Administrations

The suitable frequency of administration of the pharmaceutical composition of the present invention may be selected depending on various factors such as formulation method, administration method, patient's age, weight, sex, pathological condition, diet, administration time, administration route, excretion rate, and response sensitivity.

In one embodiment of the present invention, the daily frequency of administration of the pharmaceutical composition of the present invention may be 1 to 5 times a day, 3 times a day, twice a day, or once a day. In an embodiment of the present invention, the pharmaceutical composition may be administered once a day or twice a day.

Combination of Dosage and Frequency of Administration

A suitable combination of dosage and frequency of administration of the pharmaceutical composition of the present invention may be selected depending on various factors such as formulation method, administration mode, patient's age, weight, sex, pathological condition, diet, administration time, administration route, excretion rate, and response sensitivity.

In one embodiment of the present invention, the pharmaceutical composition of the present invention may be administered at 300 mg once a day, 200 mg once a day, 300 mg twice a day, or 200 mg twice a day.

In one embodiment of the present invention, the pharmaceutical composition of the present invention may be administered at 200 mg once a day, 210 mg once a day, 220 mg once a day, 230 mg once a day, 240 mg once a day, 250 mg once a day, 260 mg once a day, 270 mg once a day, 280 mg once a day, 290 mg once a day, 300 mg once a day, 310 mg once a day, 320 mg once a day, 330 mg once a day, 340 mg once a day, 350 mg once a day, 360 mg once a day, 370 mg once a day, 380 mg once a day, 390 mg once a day, 400 mg once a day, 410 mg once a day, 420 mg once a day, 430 mg once a day, 440 mg once a day, 450 mg once a day, 460 mg once a day, 470 mg once a day, 480 mg once a day, 490 mg once a day, 500 mg once a day, 510 mg once a day, 520 mg once a day, 530 mg once a day, 540 mg once a day, 550 mg once a day, 560 mg once a day, 570 mg once a day, 580 mg once a day, 590 mg once a day, 600 mg once a day, 100 mg twice a day, 105 mg twice a day, 110 mg twice a day, 115 mg twice a day, 120 mg twice a day, 125 mg twice a day, 130 mg twice a day, 135 mg twice a day, 140 mg twice a day, 145 mg twice a day, 150 mg twice a day, 155 mg twice a day, 165 mg twice a day, 165 mg twice a day, 170 mg twice a day, 175 mg twice a day, 180 mg twice a day, 185 mg twice a day, 190 mg twice a day, 195 mg twice a day, 200 mg twice a day, 205 mg twice a day, 210 mg twice a day, 215 mg twice a day, 220 mg twice a day, 225 mg twice a day, 230 mg twice a day, 245 mg twice a day, 250 mg twice a day, 255 mg twice a day, 260 mg twice a day, 265 mg twice a day, 270 mg twice a day, 275 mg twice a day, 280 mg twice a day, 285 mg twice a day, 295 mg twice a day, or 300 mg twice a day.

Kit

The composition of the present specification may be provided in the form of a kit. In one embodiment, the box or container included in the kit is one selected from among plastic, polyethylene, polypropylene, ethylene and propylene containers and is prepared to hold the components of the present invention. The container may be a capped tube or bottle.

Dosage Form

The pharmaceutical formulation of the present invention may be either a bilayer tablet consisting of an immediate-release (IR) layer and an extended-release (ER) layer, or a single tablet consisting of an extended-release (ER) layer.

The immediate-release layer of the bilayer tablet refers to a formulation in which S(−)-cibenzoline or a pharmaceutically acceptable salt thereof is released earlier than the extended-release layer in vivo. The configuration of immediate-release layer is not limited.

In one embodiment of the present invention, the formulation may be a multiparticulate formulation, a matrix formulation, or a sphere(s) formulation, but is not limited thereto.

In one embodiment of the present invention, the pharmaceutical formulation may include, as at least one population, pellets containing S(−)-cibenzoline or a pharmaceutically acceptable salt thereof, drug-coated spheres containing cibenzoline or a pharmaceutically acceptable salt thereof, or a layer containing cibenzoline or a pharmaceutically acceptable salt thereof.

In one embodiment of the present invention, the weight ratio between the S(−)-cibenzoline or pharmaceutically acceptable salt thereof contained in the immediate-release layer and the S(−)-cibenzoline or pharmaceutically acceptable salt thereof contained in the extended-release layer in the bilayer tablet formulation may be about 1:4 to about 1:1, about 1:3 to about 1:1, about 3:7 to about 1:1, about 1:2 to about 1:1, about 7:13 to about 1:1, about 2:3 to about 1:1, about 9:11 to about 1:1, about 1:4 to 9:11, about 1:3 to about 9:11, about 3:7 to about 9:11, about 7:13 to about 9:11, about 2:3 to about 9:11, about 1:4 to 2:3, about 1:3 to about 2:3, about 3:7 to about 2:3, about 7:13 to about 2:3, about 1:4 to 7:13, about 1:3 to about 7:13, about 3:7 to about 7:13, about 1:4 to 3:7, about 1:3 to about 3:7, or about 1:4 to about 1:3.

If the weight ratio between the S(−)-cibenzoline or pharmaceutically acceptable salt thereof contained in the immediate-release layer and the S(−)-cibenzoline or pharmaceutically acceptable salt thereof contained in the extended-release layer is less than about 1:4, it is difficult to obtain an effective effect immediately after administration of the drug, and if the weight ratio between the S(−)-cibenzoline or pharmaceutically acceptable salt thereof contained in the immediate-release layer and the S(−)-cibenzoline or pharmaceutically acceptable salt thereof contained in the extended-release layer is more than about 1:1, it is difficult to obtain an appropriate extended-release effect because the amount of the extended-release layer is reduced.

In one embodiment of the present invention, the single tablet formulation comprises an extended-release matrix in order to provide the effect of releasing S(−)-cibenzoline or a pharmaceutically acceptable salt thereof in an extended-release fashion.

In one embodiment of the present invention, the extended-release matrix is used for extended release for a certain period of time after the drug reaches a therapeutic plasma concentration while the extended-release matrix is released slowly over a longer period of time than the drug in a general formulation.

In one embodiment of the present invention, the extended-release matrix may have a viscosity of about 1,500 to about 200,000 cps, about 1,550 to about 200,000 cps, about 1,600 to about 200,000 cps, about 1,500 to about 180,000 cps, about 1,550 to about 180,000 cps, about 1,600 to about 180,000 cps, about 1,500 to about 10,000 cps, about 1,550 to about 150,000 cos, or about 1,600 to about 150,000 cps. If the viscosity is lower than about 1,500 cps or higher than about 200,000 cps, it may be difficult to achieve a desired dissolution pattern according to the pharmacokinetic behavior of S(−)-cibenzoline or a pharmaceutically acceptable salt thereof.

In one embodiment of the present invention, the extended-release matrix selected from an ionic matrix, a swellable matrix and a hydrophobic matrix, or a mixture of more than two is used.

In one embodiment of the present invention, the ionic matrix refers to a pharmaceutically acceptable matrix that controls the release of the drug through an ionic bond with the drug, and comprises at least one selected from among sodium carboxymethyl cellulose, carbomer, and sodium alginate.

In one embodiment of the present invention, the swellable matrix refers to a pharmaceutically acceptable matrix that controls the release of the drug through reduction of pores by instantaneous swelling in an aqueous solution, and comprises at least one selected from among hydroxyethyl cellulose and its salts or derivatives, hydroxypropylmethylcellulose and its salts or derivatives, polyethylene oxide and its salts or derivatives, and carrageenan.

In one embodiment of the present invention, the hydrophobic matrix refers to a pharmaceutically acceptable matrix that controls the release of the drug through blockage of pores without dissolving in aqueous solution, and comprises at least one selected from among polyvinyl acetate, glyceryl behenate, hydrogenated castor oil, hydrogenated vegetable oils, and stearic acid.

In one embodiment of the present invention, the extended-release matrix comprises at least one selected from among hydroxyethyl cellulose, hydroxypropylmethyl cellulose and its salts or derivatives, polyethylene oxide and its salts or derivatives, carboxymethyl cellulose sodium, carbomer, and polyvinyl acetate.

In one embodiment of the present invention, the content of the extended-release matrix is about 5 to about 30 parts by weight, about 6 to about 30 parts by weight, or about 7 to about 30 parts by weight, based on 100 parts by weight of the formulation. When the content of the extended-release matrix is about 5 to about 30 parts by weight, it may have excellent effects of controlling drug release and allowing cibenzoline or a pharmaceutically acceptable salt thereof to reach an optimal plasma concentration at an appropriate release rate. If the content of the extended-release matrix is more than about 30 parts by weight, problems arise in that the initial drug release is slow, 100% of the drug is not dissolved within about 12 hours, and the drug size increases, and if the content of the extended-release matrix is less than about 5 parts by weight, problems arise in that the initial drug release is fast, and the drug is completely released before about 12 hours.

Left Ventricular Outflow Track (LVOT) Gradient

Left ventricular outflow tract (LVOT) gradient refers to the difference between left ventricular systolic blood pressure and left ventricular diastolic blood pressure when measuring pressure of the outflow tract between the left ventricle and the aorta of the heart.

It is known that, when the left ventricular outflow tract (LVOT) gradient decreases, the risk of heart failure and the like due to hypertrophic cardiomyopathy decreases. The left ventricular outflow tract (LVOT) gradient may be used as a factor to evaluate a treatment method such as exercise, medication or a device in relation to heart disease.

Peak Volume of Oxygen Consumption ($PVO_2$)

The peak volume of oxygen consumption may be clinically quantified by measuring oxygen uptake ($Vo_2$), carbon dioxide production ($Vco_2$), and minute ventilation (the total amount of gas exhaled from the lungs over 1 minute). The peak volume of oxygen consumption is determined by measuring the concentration of each of $O_2$ and $CO_2$ in air, inspired and exhaled during exercise, by a gas analyzer.

The peak volume of oxygen consumption serves not only as a standard indicator in evaluating cardiovascular health but also as a strong prognostic indicator of chronic heart failure. Although the peak volume of oxygen consumption is known to be proportional to body mass, it varies depending on a variety of factors including medications, devices, exercise, and changes in body weight. The peak volume of oxygen consumption may be used as a factor in evaluating a treatment method such as exercise, medication or a device in relation to heart disease.

New York Heart Association (NYHA) Classification

New York Heart Association (NYHA) classification is a classification of the severity of heart failure, which classifies the severity of heart failure into four classes based on the subjective symptoms. The New York Heart Association (NYHA) classification was established by doctors to classify patients in 1902 when there was no measurable factor for heart donation, but is still used as an important determinant factor in heart failure.

[Four NYHA Classes]

Class I (A): Patients without limitation of activity. There are no symptoms with daily activities.

Class II (B): Patients with mild restriction of activity. Asymptomatic at rest and moderate exercise.

Class III (C): Patients with significant restriction of activity. Asymptomatic only at rest.

Class IV (D): Patients who require complete rest and must live in a bed or chair. Even slight movement can cause unpleasant symptoms.

One embodiment provides a method for treating a patient corresponding to heart failure severity class II, Ill or IV. Another embodiment provides a method for treating a patient corresponding to heart failure severity class III or IV.

In one embodiment, administration of a therapeutically effective amount of S(−)-cibenzoline lowers the New York Heart Association (NYHA) class of the subject. In one embodiment of the present invention, the improvement may be reduction from class IV to class III, from class IV to class II, from class IV to class I, from class III to class II, from class III to class I, or from class II to class I.

ElectroCardioGram (ECG)

ECG means that the activity current generated in the myocardium due to the beating of the heart is guided to two suitable places on the body surface and recorded with an ammeter to show the recording of the myocardial activity current as a picture. In general, a 12-point guided electrocardiometer is used, whereby the heart rate, the electrical axis of the heart and the degree of rotation can be evaluated, and the presence or absence of conduction abnormality in the ventricle can be found.

The waveform of the electrocardiogram signal displays the electric current and potential difference created by the contraction of the heart as a curve. In general, P wave, Q wave, R wave, S wave and T wave are continuously generated within one cycle of the electrocardiogram signal. The P wave represents the contraction of the atrium, a series of Q waves and R waves and S wave represent the contraction of the ventricles, and the T wave represents characteristics that occur during ventricular relaxation.

QRS-complex appears as a combination of Q, R and S waves related to ventricular contraction, and indicates that the heart contracts due to transmission of excitement to the ventricles.

QTc is defined as the QT interval (which is the interval between the Q wave and the T wave) corrected by the heart rate. Among the methods of calculating QTc, a method using the correction formula of the Fridericia method (QTcF=QT/$RR^{0.33}$) is defined as QTcF.

Improvement

In the present invention, the term "improvement" means ameliorating the clinical or pathological condition of a patient compared to before drug administration, and means directly or indirectly treating hypertrophic cardiomyopathy symptoms.

In one embodiment of the present invention, improving the QTcF and QRS of the electrocardiogram may mean increasing (or prolonging) the value at least after drug administration compared to the initial measured value before drug administration.

In one embodiment of the present invention, improving the left ventricular outflow tract (LVOT) gradient value may mean that the value after drug administration changes (decreases) by at least 1%, 2%, 5% or 10% or more compared to the initial measured value before drug administration. In addition, it may mean that the left ventricular outflow tract (LVOT) gradient value converges to zero. In one embodiment of the present invention, the left ventricular outflow tract (LVOT) gradient value may decrease by about 10 mmHg after drug administration.

In one embodiment of the present invention, improving the peak volume of oxygen consumption ($PVO_2$) may mean that the value after drug administration increases by at least 1%, 2%, 5% or 10% compared to the initial measured value before drug administration.

In one embodiment of the present invention, improving the symptoms classified by the New York Heart Association (NYHA) system may mean reducing the class of symptoms classified by intra- or inter-change.

Co-Administration

The cibenzoline or pharmaceutically acceptable salt thereof according to the present invention may be co-administered with other therapeutic agent for heart disease. The timing of the concurrent administration is not limited, and the additional therapeutic agent may be administered simultaneously with, before, or after administration of the cibenzoline or pharmaceutically acceptable salt thereof.

In one embodiment of the present invention, examples of the other therapeutic agent for heart disease that is co-administered include beta blockers, calcium channel blockers, antiarrhythmic drugs, etc.

In one embodiment of the present invention, examples of the other therapeutic agent for heart disease that is co-administered include atenolol, metoprolol, bisoprolol, propranolol, diltiazem, verapamil, amlodipine, disopyramide, and the like.

Maximum Plasma Concentration (Cmax), Time to Reach Maximum Plasma Concentration (Tmax), Area Under the Concentration-Time Curve (AUC), and Minimum Effective Plasma Concentration In one embodiment of the present invention, the Cmax of the composition is from about 200 ng/mL to about 700 ng/mL. In one embodiment of the present invention, the Cmax of the composition may be from about 250 ng/mL to about 700 ng/mL, or from about 300 ng/mL to about 700 ng/mL.

In one embodiment of the present invention, the Cmax of the composition may be reached about 2 to about 4 hours after administration of the pharmaceutical composition (Tmax: 2 to 4 hours).

In one embodiment of the present invention, the composition satisfies an AUC (area under the curve) of about 2,000 ng·hr/mL to about 15,700 ng·hr/mL. The AUC of the composition may be about 3,000 ng·hr/mL to about 10,000 ng·hr/mL, about 3,500 ng·hr/mL to about 9,500 ng·hr/mL, about 4,000 ng·hr/mL to about 9,000 ng·hr/mL, about 4,500 ng·hr/mL to about 8,500 ng·hr/mL, about 5,000 ng·hr/mL to about 8,000 ng·hr/mL, about 5,500 ng·hr/mL to about 7,500 ng·hr/mL, or about 6,000 ng·hr/mL to about 7,000 ng·hr/mL.

In one embodiment of the present invention, the minimum effective plasma concentration of S(−)-cibenzoline of the composition is about 160 ng/mL or more.

In one embodiment of the present invention, the minimum effective plasma concentration of the composition may be 160 ng/mL, 162 ng/mL, 170 ng/mL, 180 ng/mL, 190 ng/mL, or 200 ng/mL or more.

Assessments and Procedures to be Performed

Blood oxygen level test: Blood oxygen level is tested using a pulse oximetry device.

Vital signs: Vital signs of a patient include assessment of blood pressure, pulse rate, body temperature, and respiration rate. Measurement of blood pressure and pulse rate is performed after rest in a supine position (upward-facing posture) or in a sitting position (e.g., without factors that interfere with concentration) in a quiet environment for at least 5 minutes. The patient's vital signs are measured before blood tests and electrocardiogram (ECG)/echocardiography (ECHO), and the measurement consists of one pulse rate measurement and three consecutive blood pressure measurements.

Electrocardiogram (ECG): An electrocardiogram is a painless test for assessing the electrical activity of the heart. The electrocardiogram is checked after resting in a supine position in a quiet environment (e.g., without distracting factors) for at least 5 minutes. A sticky pad is attached to the body, and the pad has a thin wire connected to a machine that records measurements of the heart and prints a report. Each time an electrocardiogram is performed, the clinical trial staff performs three electrocardiogram recordings. The time between ECG recordings should not exceed 2 minutes, and the total time should not exceed 10 minutes.

Echocardiography (heart scanning): In a state in which the patient is lying flat, a transducer is placed on the chest of the patient, and high-frequency sound waves (sound waves higher than those that humans can hear) are delivered into the body towards the heart. As the sound wave passes through other parts of the body, a part of the wave bounces back to the transducer, and the image of the heart and blood flow is interpreted by the ultrasound machine. This is to examine the heart's ability to eject blood, as well as heart abnormalities, including the atria, valves and major blood vessels.

24-hour continuous monitoring of heart's electrical activity (electrocardiogram): The continuous electrical activity of the heart will be monitored by telemetry. During the assessment, the patient is not allowed to enter the water and should not shower or bathe. If the assessment is performed for two or more consecutive days, the device is reattached after a 30-minute bath time. All test records are monitored at all times by a trained clinical investigator. This device may lose its battery after 12 hours, and thus the battery is replaced every 12 hours.

24-hour activity ECG monitoring: The patient is provided with a device for continuous ECG monitoring. The device monitors and records the patient's cardiac activity continuously as well as intermittently. During the assessment, the patient is allowed to move freely, and the clinical investigator provides instructions on how to use the device. During the assessment, the patient is not allowed to enter the water and should not shower or bathe. If the assessment is performed for two or more consecutive days, the device is reattached after a 30-minute bath time.

Blood test: A blood sample is taken at a certain visit during this test by means of a needle inserted into a vein in the patient's arm. This blood test will be done to check the patient's general health, and to check for the following:

checking of pregnancy status, blood clotting status, liver and kidney status, presence of virus, and use of prohibited substances examination of blood proteins (troponin and cerebral natriuretic peptide) and examination of how these proteins are affected by the test drug Urine test: The patient will be asked to provide a urine sample that will be used to check general health, and other substances found in the urine may indicate disease and kidney damage.

Blood test for measuring amount of test drug in blood (pharmacokinetics): This blood test shows how the drug is distributed in and eliminated from the body. At each visit, approximately 4 mL of blood is taken from the patient either by venipuncture or an indwelling cannula inserted into the forearm vein. For each test group, about 220 mL of blood is taken while participating in the test. The clinical trial doctor may repeatedly take blood samples as required for an accurate assessment of the patient's health, or to manage side effects, or due to technical problems with the samples.

Hereinafter, the present invention will be described in detail with reference to examples. The following examples are only for illustrating the present invention, and the scope of the present invention is not limited by the following examples.

Example 1. Clinical Safety Assessment of S(−)-cibenzoline in Healthy Volunteers (Once, Single Dose)

In this study, a clinical trial was conducted on healthy volunteers by oral administration of 200 mg or 300 mg S(−)-cibenzoline succinate (purity: 99% ee) once a day for 3 weeks or oral administration of 150 mg racemic cibenzoline succinate three times a day for 3 weeks, and safety and tolerability were assessed. In the clinical trial, administration was done as follows:

Cohort 1: oral single administration of S(−)-cibenzoline succinate at 200 mg once a day Cohort 2: oral single administration of S(−)-cibenzoline succinate at 300 mg once a day Cohort 3 (control): oral administration of racemic cibenzoline succinate at 150 mg three times a day.

To assess the safety, tolerability, pharmacokinetics and pharmacodynamics of S(−)-cibenzoline, a randomized, double-blind, placebo-controlled, sequential, ascending single dose study was conducted.

In this study, a total of 24 subjects were randomized 1:1:1 to three cohorts and subjected to a total of four stages: screening, treatment period 1, drug withdrawal period, and treatment period 2. The ratio between the drug administration group and the non-drug-administration group (placebo) was 6:2.

Primary assessment variables were safety, tolerability and side effects, and the clinical trial items were 12-electrode electrocardiogram (including corrected QT interval (calculated by Fridericia formula) [QTc(F)]), QT interval, QRS interval, PR interval, and ventricular rate), vital signs (blood pressure, pulse, body temperature, respiration rate), hypersensitivity (determined by ECG recording and vital signs), clinical laboratory assessment (hematology, blood chemistry, urinalysis, etc.), and adverse events (including serious adverse events).

In addition, for blood pharmacokinetic analysis for ascending doses of cibenzoline in healthy volunteers, AUC (area under the concentration-time curve), maximum plasma concentration ($C_{max}$), time to reach maximum plasma concentration ($T_{max}$), and maximum plasma concentration half-life ($T_{1/2}$) were measured.

For participants in Cohorts 1 and 2, pharmacokinetic blood sampling was performed for 48 hours (within 60 minutes before administration of the test drug, 30 minutes, 1 hour, 1.5 hours, 2 hours, 2.5 hours, 3 hours, 4 hours, 6 hours, 8 hours, 10 hours, 12 hours, 16 hours, 24 hours, 30 hours, 36 hours, and 48 hours after administration), and pharmacokinetic blood sampling was performed the next day (after 72 hours), and the last pharmacokinetic blood sampling was performed on day 5 (after 96 hours from the first administration).

For participants in Cohort 3, pharmacokinetic blood sampling was performed at 30 minutes before drug administration (8 am), 30 minutes after drug administration, 1 hour, 1.5 hours, 2 hours, 2.5 hours, 3 hours, 4 hours, and 8 hours (before 4 pm, the time point of second drug administration), 30 minutes, 1 hour, 1.5 hours, 2 hours, 2.5 hours, 3 hours, 4 hours, and 8 hours (before third administration of the test drug) after second administration of the test drug, and 30 minutes, 1 hour, 1.5 hours, 2 hours, 2.5 hours, 3 hours, and 4 hours after third administration of the test drug, and pharmacokinetic blood sampling on day 2 and day 3 was performed after 24 hours, 36 hours and 48 hours after the time point of first drug administration (8:00 am).

In addition, for pharmacodynamic analysis of cibenzoline in healthy volunteers, left ventricular ejection fraction, left ventricular systolic and diastolic dimensions, and velocity time integral were measured.

For participants in Cohorts 1 to 3, electrocardiogram, pharmacodynamic assessment (echocardiography), etc. were performed on one day before administration, the day of administration (day 1), and for two days after administration (48 hours, day 2 and day 3).

Through the above clinical trial, it was confirmed that no serious side effects occurred in Cohorts 1 and 2 compared to Cohort 3 to which an existing drug therapy was applied.

Thereby, it was confirmed that administration of S(−)-cibenzoline at 200 mg or 300 mg once a day was safe and tolerable.

As shown in Table 1 below, it was confirmed that the Cmax and Tmax values of Cohorts 1 and 2 were similar to those of Cohort 3.

TABLE 1

|  | Cmax (ng/mL) | Tmax (h) | AUC (ng · hr/mL) |
|---|---|---|---|
| Cohort 1 | 328.6 | 2.0 | 2674.1 |
| Cohort 2 | 478.0 | 1.8 | 4076.3 |
| Cohort 3 (extract of only S(−)-cibenzoline moiety) | 367.4 (193.2) | 1.7 (1.7) | 7540.4 (3610.3) |

As shown in Table 2 below, the electrocardiogram test results for healthy volunteers in Cohorts 1 and 2 showed that QcTF and QRS increased at 1.5 hours after administration compared to before administration, and also increased even at 8 hours after administration, indicating that the test drug of the present invention exhibited the effect of prolonging QcTF and QRS. This effect of cibenzoline on the ECG values was expected to bring about a pharmacodynamic therapeutic effect in hypertrophic cardiomyopathy patients.

TABLE 2

| Cohort 1 | Day 1 (before administration) | Day 1 (1.5 hr after administration) | Day 1 (3 hr after administration) | Day 1 (8 hr after administration) |
|---|---|---|---|---|
| QTcF (ms) | 406 | 412 | 426 | 408 |
| QRS (ms) | 92 | 102 | 107 | 99 |

| Cohort 2 | Day 1 (before administration) | Day 1 (1.5 hr after administration) | Day 1 (3 hr after administration) | Day 1 (8 hr after administration) |
|---|---|---|---|---|
| QTcF (ms) | 411 | 419 | 429 | 415 |
| QRS (ms) | 101 | 107 | 116 | 107 |

Example 2. Clinical Safety Assessment of S(−)-cibenzoline in Healthy Volunteers (Single Repeated Dose)

In this study, a clinical trial was conducted in healthy volunteers with the participant groups of the following Cohorts 4 to 6, and safety and tolerability were assessed.
Cohort 4: oral administration of S(−)-cibenzoline succinate at 200 mg once a day/oral administration for a total of 5 days
Cohort 5: oral administration of S(−)-cibenzoline succinate at 300 mg once a day/oral administration for a total of 14 days
Cohort 6 (control group): oral administration of racemic cibenzoline succinate at 150 mg three times a day/oral administration for a total of 14 days To assess the safety, tolerability, pharmacokinetics and pharmacodynamics of cibenzoline, a randomized, double-blind, placebo-controlled, sequential, ascending single dose, repeated-dose study was conducted.

In this study, a total of 24 subjects were randomized 1:1:1 to three cohorts and subjected to a total of four stages: screening, treatment period 1, drug withdrawal period, and treatment period 2. The ratio between the drug administration group and the non-drug-administration group (placebo) was 6:2.

Primary assessment variables were safety, tolerability and side effects, and the clinical test items were 12-electrode electrocardiogram (including corrected QT interval (calculated by Fridericia formula) [QTc(F)]), QT interval, QRS interval, PR interval, and ventricular rate), vital signs (blood pressure, pulse, body temperature, respiration rate), hypersensitivity (determined by ECG recording and vital signs), clinical laboratory assessment (hematology, blood chemistry, urinalysis, etc.), and adverse events (including serious adverse events).

In addition, for blood pharmacokinetic analysis for ascending doses of cibenzoline in healthy volunteers, AUC (area under the concentration-time curve), maximum plasma concentration (Cmax), time to reach maximum plasma concentration ($T_{max}$), and maximum plasma concentration half-life ($T_{1/2}$) were measured.

For participants in Cohort 4, pharmacokinetic blood sampling was performed before administration of the test drug on day 3 and day 4 after the first drug administration, and performed at 30 minutes before administration of the test drug, 30 minutes, 1 hour, 1.5 hours, 2 hours, 2.5 hours, 3 hours, 4 hours, 6 hours, 8 hours, 10 hours, 12 hours, and 16 hours after administration on day 5, and performed at 24 hours after the last administration of the test drug on day 6. Pharmacokinetic analysis was performed based on the blood samples obtained on day 5 and day 6.

For participants in Cohort 5, pharmacokinetic blood sampling was performed before administration of the test drug on day 3, day 4 and day 5 after the first drug administration, and performed at 30 minutes before administration of the test drug, 30 minutes, 1 hour, 1.5 hours, 2 hours, 2.5 hours, 3 hours, 4 hours, 6 hours, 8 hours, 10 hours, 12 hours, and 16 hours after administration on day 14, and performed at 24 hours after the last administration of the test drug on day 15. Pharmacokinetic analysis was performed based on the blood samples obtained on day 14 and day 15.

For participants in Cohort 6, pharmacokinetic blood sampling was performed before test drug administration (8 am) on day 3, day 4 and day 5 after the first drug administration, and performed at 30 minutes before administration, 30 minutes, 1 hour, 1.5 hours, 2 hours, 2.5 hours, 3 hours, 4 hours, and 8 hours after administration on day 14. Pharmacokinetic analysis was performed based on the blood samples obtained on day 14.

In addition, for pharmacodynamic analysis of cibenzoline in healthy volunteers, left ventricular ejection fraction, left ventricular systolic and diastolic dimensions, and velocity time integral were measured.

For participants in Cohort 4, electrocardiogram, pharmacodynamic assessment (echocardiography), etc. were performed on one day before administration, the day of administration (day 1), one day after administration (day 2), day 5 and day 6.

For participants in Cohort 5, electrocardiogram, pharmacodynamic assessment (echocardiography), etc. were performed on one day before administration, the day of administration (day 1), and day 5, day 14 and day 15.

For participants in Cohort 6, electrocardiogram, pharmacodynamic assessment (echocardiography), etc. were performed on one day before administration, the day of administration (day 1), and day 5 and day 14.

Through the above clinical trial, it was confirmed that serious side effects did not occur in Cohorts 4 and 5 (to which cibenzoline succinate was administered multiple times) compared to Cohort 6 to which an existing drug therapy was applied. Thereby, it was confirmed that administration of S(−)-cibenzoline at 200 mg or 300 mg once a day was safe and tolerable.

In addition, Cohorts 4 and 5 to which cibenzoline succinate was administered multiple times correspond to Cohorts 1 and 2, respectively, to which cibenzoline succinate was administered once in Example 1 to demonstrate the effect thereof. The Cmax, Tmax and AUC values for Cohorts 4 and 5 are as follows.

TABLE 3

|  | Cmax (ng/mL) | Tmax (h) | AUC (ng · hr/mL) |
| --- | --- | --- | --- |
| Cohort 4 | 364.0 | 2.5 | 3182.9 |
| Cohort 5 | 515.3 | 2.3 | 4299.3 |
| Cohort 6 (extract of only S(−)-cibenzoline moiety) | 608.1 (334.2) | 1.3 (1.0) | 8876.4* (4732.2)* |

*PKs for Cohorts 4 and 5 were measured on a 24-hour basis. Cohort 6 was in a steady state, and thus the result therefor is a simulation result obtained by multiplying the PK data (2958.8 ng · hr/mL), measured on an 8-hour basis on day 14, by 3.

As shown in Table 4 below, the electrocardiogram test results for healthy volunteers in Cohorts 4 and 5 showed that QcTF and QRS increased at 1.5 hours after administration compared to before administration, and also increased even at 8 hours after administration, indicating that the test drug of the present invention exhibited the effect of prolonging QcTF and QRS. This effect of cibenzoline on the ECG values was expected to bring about a pharmacodynamic therapeutic effect in hypertrophic cardiomyopathy patients. In particular, it was confirmed that, in the case of Cohort 5, the effect of prolonging QcTF and QRS was maintained without resistance, even though the test drug was administered for 14 days.

TABLE 4

| Cohort 4 | Day 5 (before administration) | Day 5 (1.5 hr after administration) | Day 5 (3 hr after administration) | Day 5 (8 hr after administration) |
| --- | --- | --- | --- | --- |
| QTcF (ms) | 399 | 417 | 433 | 417 |
| QRS (ms) | 92 | 100 | 102 | 96 |

| Cohort 5 | Day 14 (before administration) | Day 14 (1.5 hr after administration) | Day 14 (3 hr after administration) | Day 14 (8 hr after administration) |
| --- | --- | --- | --- | --- |
| QTcF (ms) | 404 | 435 | 444 | 427 |
| QRS (ms) | 106 | 124 | 130 | 110 |

Example 3. Evaluation of Clinical Safety and Effectiveness of S(−)-cibenzoline in Obstructive Hypertrophic Cardiomyopathy (HOCM) Patient Subjects This study is a randomized, double-blind, placebo-controlled, sequential, ascending multiple-dose study to evaluate the safety, tolerability, PK and PD of S(−)-cibenzoline succinate in patients with HOCM.

Cohort 1: oral administration of S(−)-cibenzoline succinate 200 mg or placebo once a day/for a total of 5 days
Cohort 2: oral administration of S(−)-cibenzoline succinate 300 mg or placebo once a day/for a total of 5 days
Cohort 3: oral administration of S(−)-cibenzoline succinate 200 mg or placebo twice a day/for a total of 5 days Male or female subjects with HOCM who met all inclusion criteria and did not meet the exclusion criteria were enrolled in the study.

A total of up to 24 subjects were enrolled in 3 cohorts (8 per cohort). The subjects underwent at least one set of screening, hospital stay, and the end of study (EOS). Based on (1) safety data reviewed by the Safety Review Committee (SRC) and (2) consent to participate, subjects who underwent EOS in one cohort study could participate in another subsequent cohort study after a washout period of at least 7 days after they received the last investigational medicinal product on day 5 of the previous cohort study.

If subjects participated in another cohort study of Cohort 1 or 2, screening and inclusion/exclusion criteria were re-evaluated after the washout period. The subjects received up to three different doses of S(−)-cibenzoline or placebo at a 6:2 ratio for 5 days in each cohort. All subjects in each cohort were reviewed for safety data by the Safety Review Committee (SRC) after EOS before enrollment in the next dose cohort. The maximum duration of the clinical trial was over 15 weeks, including 9 weeks of screening, approximately 3 weeks of hospital stay and 3 weeks of EOS.

In the case of once-a-day administration, the test drug was administered in the morning of each administration day. In the case of twice-a-day administration, the test drug was administered at 12-hour intervals (in the morning and in the evening) on from day 1 to day 4 and administered only in the morning on day 5.

Inclusion Criteria

Subjects who meet the following criteria are considered eligible to participate in the clinical trial:
 patients with a maximal left ventricular wall thickness of 15 mm or more (13 mm or more for patients with a family history);
 patients with a left ventricular outflow tract (LVOT) gradient of 30 mmHg or more at rest, or an LVOT gradient of 50 mmHg or more after provocation (including provocation such as Valsalva maneuver, standing, post-exercise, etc.); or
 patients with a left ventricular ejection fraction (LVEF) of 55% or more.

Exclusion Criteria

Subjects (patients) who meet one or more of the following criteria are considered ineligible to participate in the clinical trial:
 1) patients with a history of heart disease, including one or more of known infiltrative, hereditary or storage disorders causing cardiac hypertrophy that mimic HCM, such as Fabry disease, amyloidosis, or Noonan syndrome with LV hypertrophy;
2) patients with a history of persistent atrial fibrillation before screening or baseline;
3) patients who underwent implantable cardioverter-defibrillator (ICD) implantation within 2 months before screening or who planned to undergo ICD implantation during the clinical trial period;
4) patients with symptoms of systolic heart failure with an ejection fraction <55% or New York Heart Association (NYHA) class IV heart failure;
5) patients with QTcF>480 msec at screening or baseline;
6) patients with systolic BP<90 mmHg or >160 mmHg and/or diastolic BP>100 mmHg or <60 mmHg at screening or baseline;
7) patients who received vardenafil hydrochloride, moxifloxacin hydrochloride, toremifene citrate, fingolimod hydrochloride or eliglustat tartrate, or other agents known to prolong QT/QTcF, within a period of at least 7 days or five times the half-life (whichever is longer) before screening;
8) patients who received disopyramide or ranolazine within a period of at least 7 days or five times the half-life (whichever is longer) before screening;
9) patients who received antiarrhythmic agents other than beta-blockers within a period of at least 7 days or five times the half-life (whichever is longer) before screening (except cases where there is no change in doses/drugs within a period of at least 7 days or five times the half-life (whichever is longer) before screening for patients on beta-blockers in the opinion of a physician);
10) patients who received inotropic agents, angiotensin converting enzyme I, angiotensin II receptor blockers (ARBs), nitrate drugs, PDE inhibitors, anticholinergics, xanthine derivatives, etc. within a period of at least 7 days or five times the half-life (whichever is longer) before screening; or
11) patients who previously received doxorubicin as a cardiotoxic agent.

Assessment Variables

Primary assessment variables were safety, tolerability and side effects, and the clinical test items were 12-electrode electrocardiogram (including corrected QT interval (calculated by Fridericia formula) [QTc(F)]), QT interval, QRS interval, PR interval, and ventricular rate), vital signs (blood pressure, pulse, body temperature, respiration rate), hypersensitivity (determined by ECG recording and vital signs), clinical laboratory assessment (hematology, blood chemistry, urinalysis, etc.), and adverse events (including serious adverse events).

For blood pharmacokinetic analysis for ascending doses of cibenzoline, AUC (area under the concentration-time curve), maximum plasma concentration ($C_{max}$), time to reach maximum plasma concentration ($T_{max}$), and maximum plasma concentration half-life ($T_{1/2}$) were measured.

In addition, for pharmacodynamic analysis of cibenzoline in patients, left ventricular ejection fraction, left ventricular systolic and diastolic dimensions, and velocity time integral were measured.

Secondary assessment variables were pharmacokinetics including Cmax, and the left ventricular outflow track (LVOT) gradient and left ventricular ejection fraction (LVEF) by transthoracic echocardiography (TTE), as wells as blood B-natriuretic peptide (BNP) and troponin levels.

It was confirmed that the left ventricular outflow tract (LVOT) gradient, a secondary assessment variable, decreased by about 10 mmHg after drug administration, indicating that the administration of S(−)-cibenzoline to the patients was effective.

Example 4. Clinical Results of S(−)-cibenzoline in Obstructive Hypertrophic Cardiomyopathy (HOCM) Patients (Cohort 1 of Example 3)

Through the clinical trial of Cohort 1 in Example 3, it was confirmed that no drug-related adverse event occurred in the patients. Thereby, it was confirmed that the administration of S(−)-cibenzoline succinate at 200 mg once a day was safe and tolerable.

Figure 2:
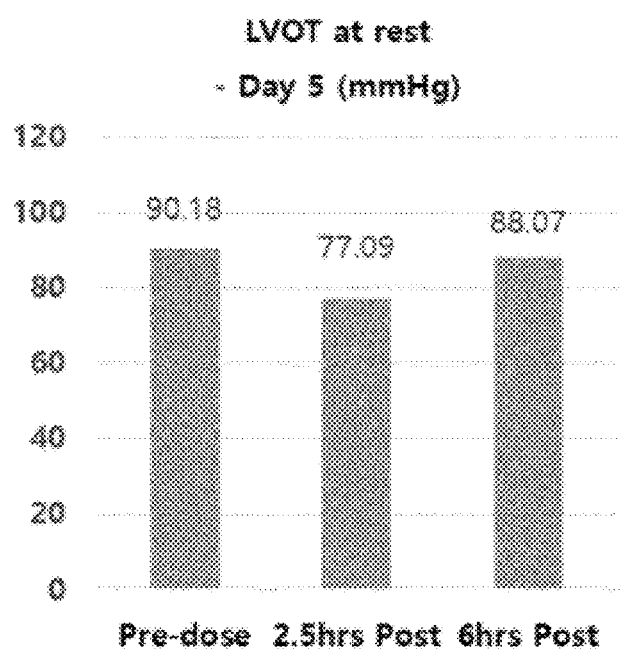
FIG. 2 is a chart showing the results of measuring the left ventricular outflow tract gradient at rest before and after administration to Cohort 1 of Example 3.

In Example 3 above, the left ventricular outflow track (LVOT) gradient), which is an effect indicator, was measured on day 5 of administration. The results of the measurement are shown in Table 5 below. It was confirmed that the LVOT gradient at rest (FIG. 2) decreased by about 13 mmHg (decrease rate of 15%) about 2.5 hours after administration and by about 2 mmHg (decrease rate of 2%) about 6 hours after administration. It was confirmed that the LVOT gradient with Valsalva maneuver (FIG. 3) decreased by about 30 mmHg (decrease rate of 24%) about 2.5 hours after administration and by about 2 mmHg (decrease rate of 2%) about 6 hours after administration.

Through the clinical trial results for Cohort 1 in Example 3, it is predicted that the administration of S(−)-cibenzoline succinate at 300 mg once a day, 200 mg twice a day (daily dose: 400 mg) or 300 mg twice a day (daily dose: 600 mg), which is a dose higher than that in Cohort 1, will show a higher therapeutic effect and a longer duration.

TABLE 5

| | | After administration (day 5) | | | |
|---|---|---|---|---|---|
| | | 2.5 hours after drug administration | | 6 hours after drug administration | |
| | Before administration (day 5) | Actual measured value | Difference from that before administration (decrease rate %) | Actual measured value | Difference from that before administration (decrease rate %) |
| Mean LVOT gradient at rest (mmHg) | 90.18 | 77.09 | 13.08 (15%) | 88.07 | 2.11 (2%) |

TABLE 5-continued

| | Before administration (day 5) | After administration (day 5) | | | |
|---|---|---|---|---|---|
| | | 2.5 hours after drug administration | | 6 hours after drug administration | |
| | | Actual measured value | Difference from that before administration (decrease rate %) | Actual measured value | Difference from that before administration (decrease rate %) |
| Mean LVOT gradient with Valsalva maneuver (mmHg) | 128.50 | 98.22 | 30.28 (24%) | 126.52 | 1.98 (2%) |

\* These data are the data before unblinding, and thus include the data for both the drug (6 people) and the placebo (2 people).

Example 5. Efficacy Evaluation of S(−)-cibenzoline in Obstructive Hypertrophic Cardiomyopathy (HOCM) Patients Through Clinical Pharmacokinetic-Pharmacodynamic (PK-PD) Comparison The following population pharmacokinetic-pharmacodynamic (PK-PD) comparison of S(−)-cibenzoline for each dose was performed to predict not only the efficacy but also the PK of future doses and regimens. Population pharmacokinetics-pharmacodynamic comparison was based on the drug administration data for healthy volunteers (HV) and HOCM patients (Cohort 1 of Example 3: oral administration of S(−)-cibenzoline succinate 200 mg or placebo once a day/for a total of 5 days).

The PK-PD comparison constructed based on the above data was used to predict the results of administration of S(−)-cibenzoline to HOCM patients. The PK-PD comparison was performed based on PK simulation using a compartment modeling approach and based on the treatment effect results for Cohort 1 of Example 3. Simulation was performed with a two-compartment model with first-order oral absorption lag time using PK data of healthy volunteers and Cohort 1 of Example 3. The results of the simulation are shown in Table 6 below.

TABLE 6

| | Cmax (ng/mL) | Tmax (h) | AUC (ng · hr/mL) |
|---|---|---|---|
| Cohort 1 of Example 3 | 364.0 | 2.5 | 3182.90 |
| Cohort 2 of Example 3* | 515.30 | 2.3 | 4299.30 |
| Cohort 3 of Example 3 | 411.34 | 2.0 | 5941.78 |

*It was confirmed through simulation that there was no significant difference in PKs between the healthy volunteers and the patients, and the results for Cohort 5 of Example 2 were adopted.

It is expected that the minimum effective plasma concentration will be determined as the pharmacokinetic concentration at 6 hours after administration, which showed an effect in Example 4 (clinical results for Cohort 1 of Example 3). As shown in Table 7 below, the concentration at after 6 hours after drug administration was 216 ng/mL, but taking into account the individual variation between the patients of Cohort 1 of Example 3, 162 ng/mL (about 160 ng/mL), which is −25% of the concentration at 6 hours after drug administration, was determined to be the minimum effective plasma concentration.

TABLE 7

| | Before administration (day 5) | After administration (day 5) | |
|---|---|---|---|
| | | 2.5 hours after drug administration | 6 hours after drug administration |
| PK concentration (ng/mL) | 29.28 | 364.00 | 216.00 |

At this time, through the simulation results shown in Table 6 above, it is expected that, because the Cmax values for Cohorts 2 and 3 of Example 3 sufficiently exceeded the predicted minimum effective plasma concentration (162 ng/mL), the administration of S(−)-cibenzoline to patients in each cohort will be clinically effective.

What is claimed is:

1. A method for treating hypertrophic cardiomyopathy comprising:
   administering to a subject in need thereof a composition comprising a therapeutically effective amount of S(−)-cibenzoline or a pharmaceutically acceptable salt of S(−)-cibenzoline,
   wherein the S(−)-cibenzoline or the pharmaceutically acceptable salt of S(−)-cibenzoline is a stereochemically pure compound with a purity of 85% ee or higher.

2. The method of claim 1, wherein the pharmaceutically acceptable salt thereof is selected from among salts with hydrochloric acid, hydrobromic acid, sulfuric acid, nitric acid, phosphoric acid, acetic acid, propionic acid, hexanoic acid, heptanoic acid, cyclopentanepropionic acid, glycolic acid, pyruvic acid, lactic acid, malonic acid, succinic acid, malic acid, maleic acid, fumaric acid, tartaric acid, citric acid, benzoic acid, o-(4-hydroxy-benzoyl)-benzoic acid, cinnamic acid, mandelic acid, methanesulfonic acid, ethanesulfonic acid, 1,2-ethanedisulfonic acid, 2-hydroxyethanesulfonic acid, benzenesulfonic acid, p-chlorobenzenesulfonic acid, 2-naphthalenesulfonic acid, p-toluenesulfonic acid, camphorsulfonic acid, 4-methyl-bicyclo[2.2.2]oct-2-ene1-carboxylic acid, gluco-heptonic acid, 4,4-methylenebis(3-hydroxy-2-naphthoic) acid, 3-phenylpropionic acid, trimethyl-acetic acid, tertiary butylacetic acid, lauryl sulfuric acid, gluconic acid, glutamic acid, hydroxy-naphthoic acid, salicylic acid, stearic acid, dibenzoyl-tartaric acid, 2,3-dibenzoyl-tartaric acid, O,O-dibenzoyl-tartaric acid monohydrate, O,O-dibenzoyl-tartaric acid mono(dimethylamide), di-p-toluoyl-tartaric acid monohydrate, O,O-di-p-toluoyl-tartaric acid, menthyloxyacetic acid, α-methoxy-α-trifluoromethylphenylacetic acid, 5-oxo-2-tetrahydrofurancarboxylic acid, N-(1-phenylethyl)phthalamic acid, 2-phenylpropionic acid, pyroglutamic acid, quinic acid, aspartic acid, 1,4-benzodioxane-2-carboxylic acid N,N-bis [1-phenylethyl]phthalamic acid, 3-bromocamphor-10-sulfonic acid hydrate, camphanic acid, muconic acid, sodium, potassium, calcium, magnesium, aluminum, iron and zinc ions.

3. The method of claim 1, wherein the pharmaceutical composition contains the S(−)-cibenzoline or the pharmaceutically acceptable salt of S(−)-cibenzoline at a total daily dose of 200 mg, 300 mg, 400 mg or 600 mg.

4. The method of claim 1, wherein the pharmaceutical composition is administered once or twice a day.

5. The method of claim 1, wherein the pharmaceutical composition is administered at 300 mg once a day, 200 mg once a day, 300 mg twice a day, or 200 mg twice a day.

6. The method of claim 1, wherein the hypertrophic cardiomyopathy is hypertrophic obstructive cardiomyopathy (HOCM).

7. The method of claim 1, wherein the pharmaceutical composition has one or more of the following characteristics:
   i) the Cmax of the composition is about 200 ng/ml to about 700 ng/ml;
   ii) the AUC of the composition is about 2,000 ng·hr/mL to about 15,700 ng·hr/mL; or
   iii) the minimum plasma concentration of S(−)-cibenzoline of the composition is 160 ng/ml or more.

8. The method of claim 1, wherein a minimum plasma concentration of the pharmaceutical composition is 160 ng/ml or more.

9. The method of claim 1, wherein the hypertrophic cardiomyopathy is hypertrophic obstructive cardiomyopathy (HOCM) having one or more of the following characteristics:
   a) a maximal left ventricular wall thickness of 15 mm or more (13 mm or more if there is a family history);
   b) a left ventricular outflow tract (LVOT) gradient of 30 mmHg or more at rest, or an LVOT gradient of 50 mmHg or more after provocation (including Valsalva maneuver, standing, post-exercise, etc.); or
   c) a left ventricular ejection fraction (LVEF) of 55% or more.

10. The method of claim 1, wherein the pharmaceutical composition is not administered to hypertrophic cardiomyopathy patients having one or more of the following characteristics:
   1) patients with a history of heart disease, including one or more of known infiltrative, hereditary or storage disorders causing cardiac hypertrophy that mimic HCM, such as Fabry disease, amyloidosis, or Noonan syndrome with LV hypertrophy;
   2) patients with a history of persistent atrial fibrillation before screening or baseline;
   3) patients who underwent implantable cardioverter-defibrillator (ICD) implantation within 2 months before screening or who planned to undergo ICD implantation during a clinical trial period;
   4) patients with symptoms of systolic heart failure with an ejection fraction <55% or New York Heart Association (NYHA) class IV heart failure;
   5) patients with QTcF>480 msec at screening or baseline;
   6) patients with systolic BP<90 mmHg or >160 mmHg and/or diastolic BP>100 mmHg or <60 mmHg at screening or baseline;
   7) patients who received vardenafil hydrochloride, moxifloxacin hydrochloride, toremifene citrate, fingolimod hydrochloride or eliglustat tartrate, or other agents known to prolong QT/QTcF, within a period of at least 7 days or five times the half-life (whichever is longer) before screening;
   8) patients who received disopyramide or ranolazine within a period of at least 7 days or five times the half-life (whichever is longer) before screening;
   9) patients who received antiarrhythmic agents other than beta-blockers within a period of at least 7 days or five times the half-life (whichever is longer) before screening (except cases where there is no change in doses/drugs within a period of at least 7 days or five times the half-life (whichever is longer) before screening for patients on beta-blockers in the opinion of a physician);
   10) patients who received inotropic agents, angiotensin converting enzyme I, angiotensin II receptor blockers (ARBs), nitrate drugs, PDE inhibitors, anticholinergics, xanthine derivatives, etc. within a period of at least 7 days or five times the half-life (whichever is longer) before screening; or
   11) patients who previously received doxorubicin as a cardiotoxic agent.

11. The method of claim 1, wherein the pharmaceutical composition improves a left ventricular outflow tract (LVOT) gradient value.

12. The method of claim 11, wherein the improvement is a change (or decrease) of at least 1%, 2%, 5%, or 10% relative to an initial measured value.

13. The method of claim 1, wherein the pharmaceutical composition is co-administered with other therapeutic agent for heart disease.

14. The method of claim 13, wherein the other therapeutic agent for heart disease is selected from the group consisting of beta blockers, calcium channel blockers, and antiarrhythmic drugs.

* * * * *